(No Model.)
W. LAMPERT.
Apparatus and Process for Preparing Bretzels Previous to Baking.
No. 229,320. Patented June 29, 1880.
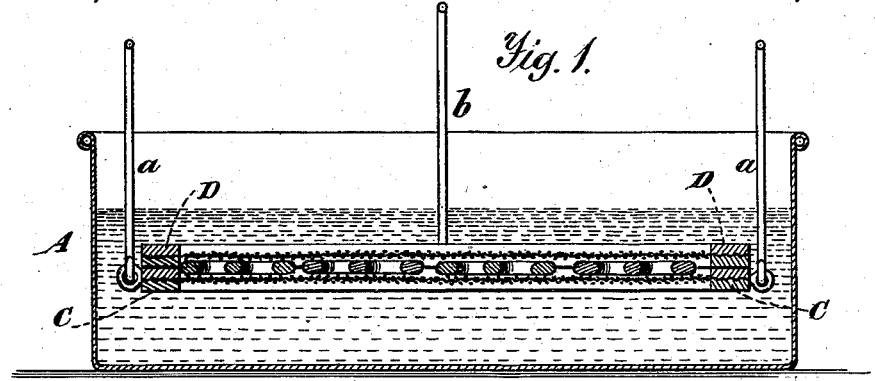
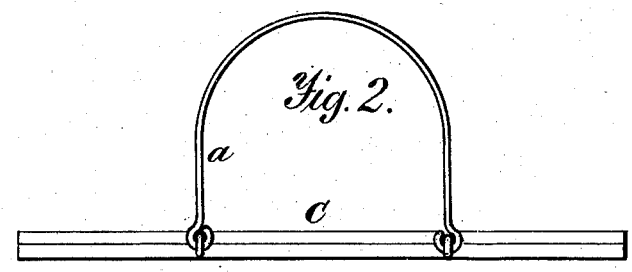
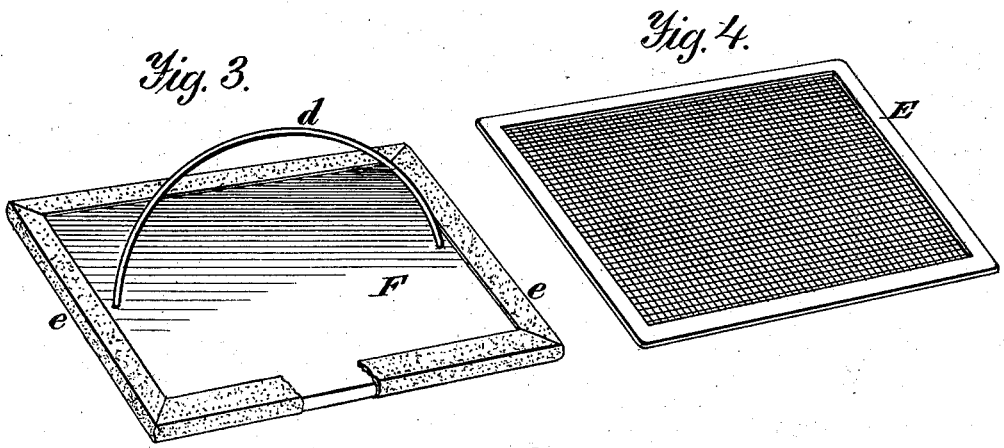
Witnesses.
A. Ruppert.
Jas. H. Sange.
Inventor:
Wm. Lampert.
per Edson Brothers
Attorneys.

UNITED STATES PATENT OFFICE.

WILLIAM LAMPERT, OF CRESTLINE, OHIO.

APPARATUS AND PROCESS FOR PREPARING BRETZELS PREVIOUS TO BAKING.

SPECIFICATION forming part of Letters Patent No. 229,320, dated June 29, 1880.

Application filed April 3, 1880. (No model.)

*To all whom it may concern:*

Be it known that I, WILLIAM LAMPERT, of Crestline, in the county of Crawford and State of Ohio, have invented certain new and useful Improvements in Apparatus and Process for Preparing Bretzels Previous to Baking; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The nature of my invention relates to bakers' tools for preparing bretzels ready to be baked; and it consists in certain devices and the manner of using the same, as will be hereinafter more fully set forth.

In the annexed drawings, to which reference is made, and which fully illustrate my invention, Figure 1 is a central vertical section of the boiler or kettle with the bretzels placed between two screens therein. Fig. 2 is a side view of the two screens. Fig. 3 is a perspective view of the salter. Fig. 4 is a similar view of the screen-pan. Fig. 5 shows the board on which the bretzels are first arranged.

A represents a kettle of any suitable dimensions. B is the ordinary bretzel-board. C is the bottom screen, provided with handles *a a*. D is the top screen, provided with handle *b*. E is a wire pan, and F the salter. The salter F consists of a flat piece of wood covered with flannel *e*, and provided with a handle, *d*.

The ordinary way of handling bretzels is to place them on the board B, and after they have raised they are taken by handfuls and dropped into the kettle in boiling lye, where they sink to the bottom and then rise to the surface, and are fished out by a perforated skimmer, and then placed on a pan, salted, and baked. By this method many of them will open or loosen at the ends. They also sometimes stay too long at the bottom of the boiler, or come to the surface too soon. Not many at one time can be handled in this way.

My method of handling is as follows: The bretzels are placed on the board B right side up, and after they have raised the bottom screen, C, is laid on top of them and the whole turned upside down, which leaves the bretzels on the bottom screen right side down. The board B is then taken off and the top screen D placed over the bretzels to keep them in their places. Both screens, with the bretzels between them, are placed in the kettle to boil, but the floating of the bretzels is prevented by the screens. After boiling, the two screens, with the bretzels between them, are taken out of kettle, the top screen, D, removed, and the wire pan E put in its place. The whole is then turned over, leaving the bretzels on the pan right side up. The flannel covering of the salter F is then dampened, dipped in salt, and applied to the top side of the bretzels, when they are ready to go in the oven and bake.

By the use of the two screens C and D, as described, I prevent the opening of the bretzels at the ends, and also prevent their floating in the boiler. They are kept in place, and the necessity of handling them separately is obviated, and a large amount can be handled at one time.

Bretzels that are well "proved" will float; otherwise they sink and remain too long at the bottom of the boiler.

Under my method the bretzels are kept a uniform and the required time below the surface of the liquid, and are thus uniformly cooked, and the breaking and overboiling of under-proved bretzels are avoided.

Having thus fully described my invention, what I claim as new, and desire to secure by Letters Patent, is—

1. The screens C and D, in combination with the kettle A, board B, and wire pan E, substantially as and for the purposes herein set forth.

2. As a step in the process for preparing bretzels for baking, the placing a number of bretzels on a board, then, by reversing, placing them between two screens, immersing said screens, with the bretzels between them, in a boiler or kettle, substantially as set forth.

3. The process of preparing bretzels for baking, consisting, essentially, in placing a number of them on a board, then, by reversing, placing them between two screens, immersing said screens, with the bretzels between them, in a boiler or kettle, removing the same, and, by reversing, placing the bretzels on a screen-pan, and then salting the same, substantially as herein set forth.

In testimony that I claim the foregoing I have hereunto set my hand this 11th day of March, 1880.

WILLIAM LAMPERT.

Witnesses:
NATHAN JONES,
ADAM BILSING.